Dec. 16, 1958  J. BUDNICK  2,864,102
DIE HEAD PROVIDING QUICK CHANGE OF CHASERS
Filed March 29, 1957
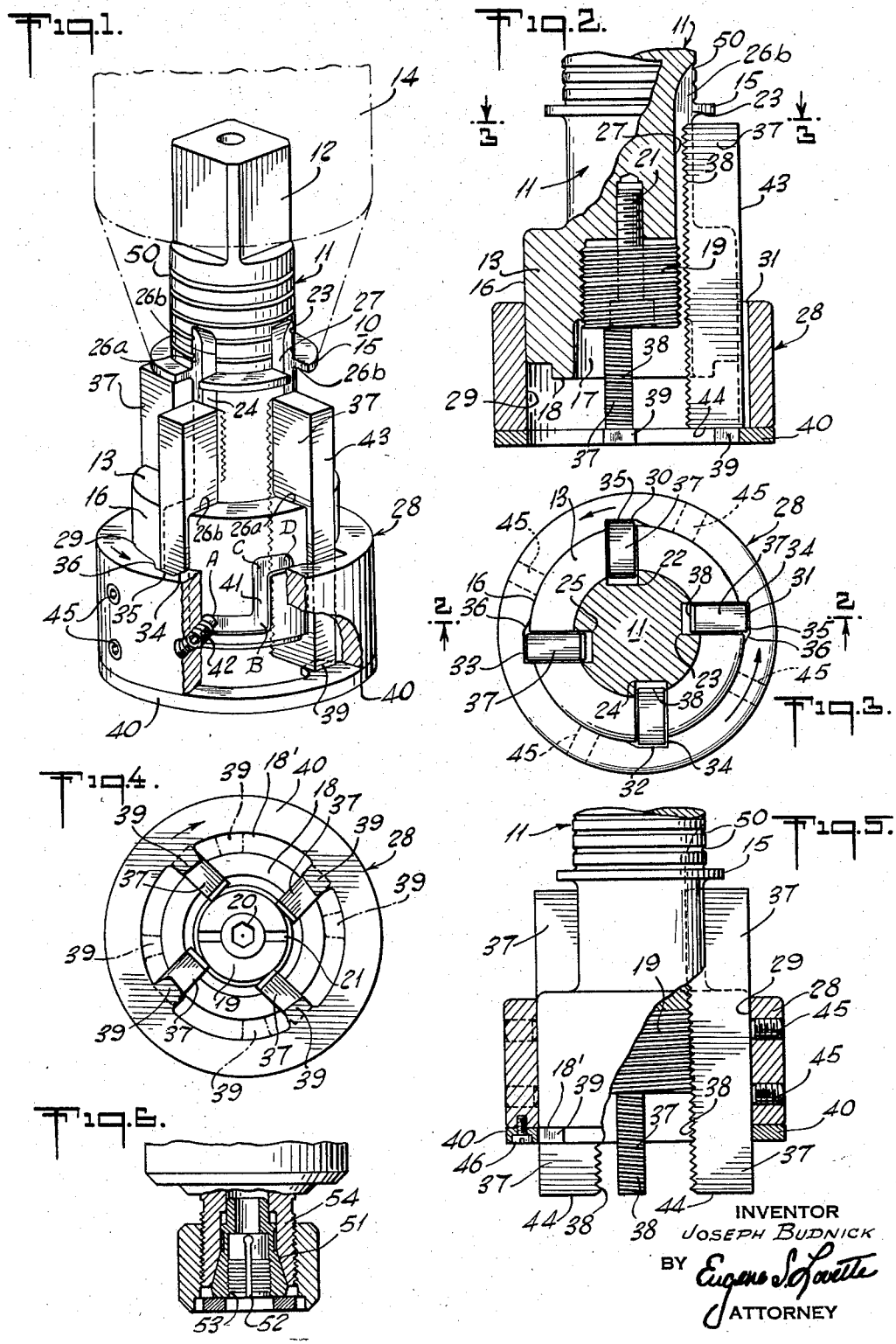
INVENTOR
JOSEPH BUDNICK
BY Eugene S. Lovette
ATTORNEY

2,864,102

DIE HEAD PROVIDING QUICK CHANGE OF CHASERS

Joseph Budnick, New York, N. Y., assignor to Electrical Fittings Corporation, Woodside, N. Y., a corporation of New York Application March 29, 1957, Serial No. 649,466

7 Claims. (Cl. 10—121)

The instant invention relates to a die head for holding cutting chasers, and in particular, a die head adapted to provide quick change of chasers without removal of said die head from a tool holder and in addition, structure for locking positively the die head in such tool holder.

The die head of the instant invention is concerned with apparatus for cutting external threads wherein a vertically suspended cutting tool, the die head, is longitudinally translated and simultaneously rotated to engage workpieces in order to cut an outside thread thereon. Upon completion of such cutting operation, the cutting tool is rotated in the opposite direction to effect withdrawal from the workpiece. During such cutting operation it is often necessary to remove cutting chasers from the die head in order to repair or otherwise rework certain of the chasers. In prior art apparatus, the complete die head must be removed from the tool holder in order to exchange worn chasers with sharpened chasers. Such removal often requires as much as thirty minutes of time and therefore stops the operation of automatic machinery during such interval. In addition, prior art structure makes no allowance for aligning automatically chasers upon clamping of same in the die head. The machinist is expected to align the chasers by eye. Errors in alignment are often known to occur because of such visual alignment and cause spoilage and additionally further delay in cutting of threads.

It is, therefore, the main object of the instant invention to provide a die head which affords quick change of cutting chasers, for example, within a period of two minutes. The unique and novel construction of the die head eliminates prior art requirement of complete removal of the die head from the die holder in order to exchange chasers. In order to carry out this object, a longitudinal cylindrical die body is provided with longitudinally extending recesses along its outer periphery in which individual chasers are clamped. A removable sleeve is provided with cam recesses, which sleeve is mounted over the lower enlarged end of the die body. The sleeve is designed to move from a first to a second of two positions on said body. When in the first of said positions, the cam recesses are aligned with respective die body recesses to allow insertion or removal of chasers. Whereas in the second of two positions, the sleeve by virtue of a camming action, locks the chasers into the die body recesses for cutting operation.

It is another principal object of the instant invention to incorporate structural means in the die tool for aligning automatically respective chasers for cutting operation without the need of an operator to line up said chasers by eye. The sleeve is provided with stop platforms extending radially across the cross-section of cam recesses. When the chasers are initially dropped into the aligned recesses, the frontal face of each chaser rests upon a respective platform and accordingly, initially aligns all chasers. As the sleeve is rotated to the second of its two positions, the chasers are urged by sleeve cam action into threaded engagement with a threaded aligning plug carried by the die head. The plug is centrally disposed within the confronting threaded surfaces of the cutting chasers and threaded engagement with the plug is achieved as the chasers slide off respective platforms. Accordingly, alignment is maintained by the threaded engagement of chasers and alignment plug.

In furtherance of the foregoing objects, it is a further object to provide a bayonet slot on the enlarged portion of the die body operatively engaged by a dog-set-screw carried by the sleeve whereby longitudinal and rotational displacement of sleeve on the die body is defined by the dog-set-screw and bayonet slot engagement in order to move the sleeve back and forth from its first to second positions.

It is a further object of the instant invention to provide a die tool for quick changing of chasers which affords economy in construction, simplicity and economy in use, and by virtue of its unique and novel construction, provides extensive clamping jaws to eliminate substantially chatter during cutting operation.

It is a further object of the instant invention to provide recessed beds in the die body recesses adapted to serve as abutment beds for the portion of the confronting threaded face of respective chasers and which beds may be axially disposed with respect to the longitudinal axis of the die body in order to provide a desirable cutting angle for cutting of threads on a workpiece.

It is a further object of the instant invention to provide means for positively locking a cutting tool in a tool holder to prevent longitudinal slippage from said holder during cutting operation and in particular, to provide annular grooves on one of the contiguous surfaces of the tool and collet of the tool holder wherein gripping is effected and annular ridges on the other of the contiguous surfaces in order to engage said grooves and thereby locking positively the cutting tool against slippage from the tool holder.

Further objects and advantages will become apparent from the following description taken in conjunction with the figures, in which:

Fig. 1 is a longitudinal elevation, partly in section and partly cut-away, of a die head incorporating the principles of the instant invention;

Fig. 2 is a fragmentary longitudinal elevation of the die head, partly in section and partly cut-away, and taken along line 2—2 of Fig. 3;

Fig. 3 is a top plan of the die tool taken along line 3—3 of Fig. 2;

Fig. 4 is a bottom plan view of the die head tool showing the frontal faces of the respective components making up the tool including the chasers;

Fig. 5 is a longitudinal fragmentary elevation, partly in section and partly cut-away, showing the respective positions of the die tool components when the tool is locked for cutting operation; and Fig. 6 is a longitudinal view, partly in section, of a collet provided with annular ridges adapted to engage positively grooves on the die tool shank in order to lock the tool in a tool holder.

Reference is now made to the figures which illustrate a cutting die tool 10 incorporating the principles of the instant invention. Tool 10 is made up of a longitudinal and substantially cylindrical die body 11. Body 11 has opposite end portions 12, 13. Upper shank portion 12 is grooved for better holding property and shaped to permit body 11 to be carried and gripped by a holding member such as a chuck of a vertical power tool such as 14. The frontal face of power tool chuck 14 is adapted to abut against a radial flange 15, provided at the chuck gripping portion of body 11. The frontal portion 13 of body 11 is cylindrical-shaped and enlarged. Enlarged portion 13 is provided with an outer peripheral bearing surface 16 and with a hollowed out interior recess 17. The forward portion of recess 17 serves as a clearance for the workpiece on which threads are to be cut; recess 17 extends rearwardly from the frontal surface 18 of enlarged portion 13. A cylindrical aligning plug 19 is provided with an outer helically threaded surface and a central through bore to receive a countersunk retaining screw 20. The threaded surface of plug 19 is designed to accommodate threaded engagement with standard cutting threads of cutting chasers as will be apparent from the following disclosure. A screw driver slot 21 at the frontal face of plug 19 facilitates threaded advancement of plug 19 into a threaded internal bore portion of recess 19 upon assembly of die body 11. Plug 19 is firmly anchored therein by screw 20.

A plurality of mutually spaced apart recesses 22, 23, 24, and 25 extend inwardly from the circumferential surface of body 11. Recesses 22—25 extend longitudinally along body 11 from the upper portion thereof and terminate at the frontal surface 18 of enlarged portion 13. The illustrated embodiment employs four recesses. It will be understood that three or more recesses may be used; the quantity of recesses may be determined by the number of cutting chasers desired. The portions of the recesses above plug 19 are defined by opposed side walls 26a, 26b and recessed beds 27. Beds 27 lie in a plane substantially at right angles to the plane of walls 26a, 26b. At the enlarged portion 13, recesses 22—25 cut completely through the wall of such enlarged portion 13. The outer threaded surface of anchored plug 19 is dimensioned to continue beds 27 of recess 22—25; recessed beds 27 are designed to terminate at the upper portion of anchored plug 19, as best seen in Fig. 2. In the illustrated embodiment, recesses 22—25 are off-set with respect to the center lines as shown in Fig. 3 where recess walls 26a are shown coinciding with respective center lines. This is a matter of choice and determines rake angle of the cutting chasers.

A cylindrical-shaped ring sleeve 28 is provided with an internal through bore 29 and is adapted for removable mounting over enlarged portion 13. Bore 29 is dimensioned to fit snugly over bearing surface 16. Sleeve 28 is provided with a plurality of spaced apart cam recesses 30, 31, 32, and 33 disposed longitudinally along its inner bore surface 29. In addition to being removably mounted on bearing surface 16, the mounted sleeve 28 is adapted to move from a first to a second of two positions on enlarged portion 13. When sleeve 28 is disposed in its first position, individual ones of cam recesses 30—33 line up longitudinally with respective die body recesses 22—25 as shown in Figs. 1, 2, 3, and 4. With movement of sleeve 28 to the second of its two positions, note direction of arrows in Figs. 1, 3, and 4, said aligned pairs of respective recesses are parted. From a horizontal plan view, for example Fig. 3, it is seen that the contour of each cam recess 30—33 comprises a side wall defining a straight edge 34 joined to the back wall having a straight portion defining a straight edge 35 disposed substantially at right angles to the first edge 34. The back wall 35 ultimately merges with the inner bore surface 29 of sleeve 28 as seen from its oblique edge 36. Oblique cam edges 36 of recesses are inclined in the same sense for the reason to be apparent hereinafter. When sleeve 16 is disposed to occupy its first position such that respective pairs of recesses are aligned, the overall transverse or radial dimension defined by respective aligned and juxtaposed cam and die body recesses provides sufficient clearance to receive and nest a threaded cutting chaser 37. Each chaser 37 is a parallelepiped provided with a long narrow threaded cutting face 38 turned to confront aligning plug 19. As noted hereinbefore, the aligned recesses provide sufficient clearance between back wall 35 and plug 19 for insertion of chasers 37 in respective pairs of recesses or removal therefrom. On the other hand, recess side walls 26a, 26b serve as vertical guides for chasers 37 and provide no more lateral clearance than this is mechanically necessary to hold chasers 37 approximately vertically upright.

Longitudinal advancement of chasers 37 is arrested by respective flat coplanar and substantially horizontal stop platforms 39. Stop platforms 39 are integral, radially inward extensions of a flat ring-shaped member 40. Ring member 40 is anchored such as by bolts 46 to the frontal face of sleeve 28. The center of member 40 is open except for the plurality of stop platforms 39. Individual ones of stops 39 are adapted to extend across the cross section of respective cam recesses 30—33. The frontal face 44 of each chaser 37 is adapted to rest upon a respective stop abutment 39.

A bayonet slot 41 is disposed along bearing surface 16 of enlarged portion 13. Slot 41 is engaged by a dogpoint screw 42 threadedly and horizontally suspended by sleeve 28. Operative engagement of dogpoint screw 42 and slot 41 determines the relative movement of sleeve 28 with respect to body 11. When sleeve 28 occupies the first of its two positions, it will be understood that dogpoint screw 42 is at point A of slot 41.

Initial rotation of sleeve 28 (by hand) counterclockwise (in direction of arrow) as seen in Fig. 1, brings dogpoint screw 42 to point B in slot 41. During such motion, lateral movement of chasers 37 is prevented by the opposed side and guide walls 26a, 26b of body recesses 22—25. On the other hand, the cam walls defined by oblique edges 36 operatively engage the longitudinal back faces 43 of respective chasers 37 and gradually urge chasers 37 radially inward to engage positively threaded plug 19. Ultimately, chasers 37 are shifted out of respective cam recesses 30—33 by cam walls 36 as such rotation continues until chasers 37 are clamped between inner bore surface 29 of sleeve 28 and threaded plug 19.

It will be understood that the frontal faces 44 of chasers 37 are suitably prepared to serve as a reference surface adapted to rest initially on stop abutments 39. For a four chaser tool, chaser frontal faces 44 are ground so that the cutting threads 38 of each chaser are successively displaced from the threads of adjacent chasers by ¼ pitch to compensate for helix angle of the thread to be cut. Such longitudinal displacement is measured from a plane containing the frontal faces 44. When chasers 37 are suspended from stops 39, the cutting threads 38 of respective chasers 37 are automatically and mutually aligned for cutting workpieces, and such alignment is maintained as sleeve 28 travels from its first to its locked position. Cutting alignment is maintained, because as chasers 37 glide along and off stop abutments 39 upon being shifted out of cam recesses 30—33, the cutting threads of the chasers 37 are urged simultaneously into positive threaded engagement with aligning plug 19. The threadedly engaged chasers are now held in desired cutting alignment.

When dogpoint screw 42 reaches point B along slot 41, platforms 39 have shifted to occupy the dashed line position shown in Fig. 4. This clears sleeve 28 for rearward axial motion because the faces 44 of the threadedly engaged chasers 37 no longer extend across the path of stops 39. Sleeve 28 is then urged (manually) longitudinally and rearwardly with respect to die body 11 until dogpoint screw 42 reaches point C of slot 41. Travel of dogpoint screw 42 from point B to point C, repositions frontal faces 44 of chasers 37 forwardly of member 40 of sleeve 28, as shown in Fig. 5. During such movement it will be understood that chasers 37 remain substantially clamped in respective recesses 22—25 by sleeve inner bore surface 29, as sleeve 28 rides up along bearing surface 16. Bore surface 29 is also adapted to slide along back faces 43 of chasers 37. Thereafter sleeve 28 is turned (manually) counterclockwise, direction of arrow in Fig. 1, until dogpoint screw 42 reaches point D of slot 41. The latter position represents the second of the two positions for sleeve 28 with respect to die body 11. Sleeve 28 may be positively locked in its second position by set screws 45 threadedly and horizontally suspended in sleeve 28 or through action of precise camming. Screws 45 have inner ends adapted to bear positively against back walls 43 of respective chasers 37. In this final locked position, it will be realized that chasers 37 are firmly nested or clamped between side walls 26a, 26b and between threaded plug 19 and screws 45, which positive nesting prevents chattering during cutting operation.

The disclosed structure provides extensive gripping jaws for firmly holding chasers 37 in position. For example, the longitudinal length of inner bore surface 29 provides a long gripping jaw against the rear chaser walls 43. On the other hand, the gripping jaw along chaser cutting faces 38 comprises a threaded plug 19 and respective recessed beds 27. It will be understood that recessed beds 27 are dimensioned so that chaser cutting surfaces 38 bear positively against said beds when clamped by tool 10. Accordingly, the entire chaser cutting face 38 bears against a clamping jaw except for the forwardly projecting portion which is adapted to cut workpieces.

If desired, recessed beds 27 may be inclined with respect to the longitudinal axis of body 11 in order to tilt individual chasers 37 to provide a desirable cutting angle with respect to the longitudinal axis of body 11. As an alternative, wedges (not shown) may be disposed between recessed beds 27 and confronting chaser cutting faces 38 to obtain the desired cutting angle. Additional rigidity is afforded to tool 10 by providing an annular stepped shoulder 18' at frontal surface 18 of die body 11, which shoulder 18' is adapted to bear positively against stop abutments 39 when sleeve 28 is locked in its second position.

The axial length of chaser cutting surfaces 38 projecting frontally from member 40, as seen in Fig. 5, may be increased by suitably dimensioning sleeve 28, or by relocating dogpoint screw 42, or by suitably increasing the axial length of ring member 40 in order to increase the axial depth of threads cut on a workpiece. With respect to the last alternative, ring member 40 may be replaced by another ring member provided with a longer axial length. The stop abutments 39 are at the frontal surface of ring member 40. Consequently upon insertion into aligned recesses, chasers 37 drop a greater distance until arrested by such stop abutments in comparison to the illustrated embodiment.

In operation die body 11 is inserted into a power tool chuck 14. Sleeve 28 is mounted over bearing surface 16 and rotated until respective pairs of recesses are aligned. Chasers 37 are nested in such aligned recesses in properly identified sequence. Sleeve 28 is turned so that dogpoint screw 42 travels from point A to point D along slot 41 at which time dogpoint screw 42 is advanced to lock sleeve to body 11. Bolts 45 are threadedly advanced to complete firm clamping of chasers 37. Tool 10 is ready for operation. Should there be reason to remove any one or more of chasers 37, the operator merely threadedly retracts respective set screws 45 so that sleeve 28 may be bought back to its initial position with dogpoint screw 42 in position A of slot 41. The individual chaser 37 is removed without taking body 11 out of chuck 14. Nor is it necessary to remove sleeve 28 from bearing surface 16. The removed chaser is replaced with a new chaser. Sleeve 28 is moved back to its second position and locked, wherein tool 10 is ready for operation again. This procedure may consume only about two minutes of the operator's time in contrast to the expenditure of thirty minutes in order to remove the tool when prior art structure is used. It will be understood that to facilitate movement of sleeve 28, its outer peripheral surface may be knurled or otherwise scored to facilitate a firm grip of sleeve 28 by hand.

It is, therefore, seen by virtue of the disclosed structure the positively engaged chasers 37 are aligned for cutting within one pitch of a thread and in effect, substantially perfect alignment is established thereby.

From Figs. 1 and 5, it is seen that shank 12 of die body 11 is provided with annular spaced apart grooves 50. Grooves 50 are substantially V-shaped. Shank 12 cooperates with a cylindrical spring collet 51 shown in Fig. 6 in order to positively lock tool 10 against longitudinal slippage from holder 14. Collet 51 has an outer peripheral shape basically of prior art design, to sit in a contractible sleeve 54 of tool holder 14 and an inner through bore to receive shank 12. Collet 51 is slotted at 52 to permit contraction upon contraction of the jaws of the tool holder 14. In accordance with the instant invention, the inner bore surface of collet 51 is provided with annular spaced apart ridges 53. Ridges 53 are disposed to engage respective ones of said grooves 50 upon contraction of holder jaws. When ridges 53 lock in respective grooves 50, tool 10 is positively locked in body 14 to prevent any possible longitudinal slippage out of the tool member 14. It will be understood that this locking arrangement can be modified so that grooves 50 appear on collet 51 and ridges 53 on the shank 12.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What I claim is:

1. Die apparatus comprising, a longitudinal die body having an enlarged frontal end defining an outer peripheral bearing surface, said enlarged end terminating with a frontal surface and also having a hollowed interior extending rearwardly from said frontal surface, said body having a plurality of circumferentially spaced apart recesses extending inwardly from the outer circumferential surface thereof and longitudinally therealong to said frontal surface of said enlarged end, said recesses extending through the circumferential wall of said enlarged end, a threaded alignment plug suspended in the interior of said enlarged end, a movable sleeve for clamping threaded cutting chasers in said recesses, said sleeve having an interior bore surface adapted to fit snugly over said bearing surface and also having a plurality of circumferentially spaced apart and longitudinally extending recesses along its interior bore surface, said sleeve being movable with respect to said body from a first to a second of two positions along said bearing surface, each sleeve recess being provided with a stop abutment at its frontal end, respective ones of said sleeve and body recesses being in alignment for said first position so that each set of aligned recesses provides a transverse clearance for receiving and nesting respective ones of said chasers wherein the threaded cutting surfaces thereof confront said threaded plug and the frontal ends of said chasers rest upon correlated stop abutments, said stop abutments being adapted to arrest said chasers against forward longitudinal motion as each chaser rests in a correlated set of aligned recesses, whereby said chasers are initially aligned to be clamped to said die body, said aligned recesses being parted upon movement of said sleeve to the second of its positions, and means on said sleeve operatively engaging said chasers upon sleeve movement from said first to second of its positions and causing said chasers during such movement to shift off said stop abutments and out of respective sleeve recesses and into positive threaded engagement with the confronting alignment plug, whereby said chasers are firmly clamped between said sleeve bore surface and said plug so that accurate alignment of the cutting threads of said chasers is effected.

2. Apparatus as defined in claim 1 further including, a slot disposed upon said bearing surface of said enlarged end, means on said sleeve for operatively engaging said slot in order to determine the relative movement of said sleeve in respect to said die body, whereby said sleeve is moved from said first to second of its two positions.

3. Apparatus as defined in claim 1, wherein said operatively engaging means including a cam surface in said sleeve recesses, said apparatus also including interconnected longitudinal and circumferential grooves disposed along said bearing surface of said enlarged end and defining a bayonet slot, means on said sleeve operatively engaging said bayonet slot in order to determine the relative movement of said sleeve circumferentially and longitudinally in respect to said die body, whereby said sleeve is moved from said first to second of its two positions, movement of said sleeve to its second position causes same to retract longitudinally from the frontal surface of said die body and the frontal ends of said chasers.

4. Apparatus as defined in claim 1 wherein, said enlarged end has an annular stepped face at its frontal surface and said sleeve has a flange at its frontal end adapted to engage said stepped face to provide firm nesting of said body in respect to said sleeve upon movement of said sleeve to its second position.

5. Die apparatus comprising, a longitudinal die body having an enlarged frontal end portion defining an outer peripheral bearing surface, said enlarged portion terminating with a frontal surface and also having a hollowed interior extending rearwardly from said frontal surface, said body having a plurality of circumferentially spaced apart recesses extending inwardly from the outer circumferential surface thereof and longitudinally to said frontal surface of said enlarged portion, said recesses extending through the circumferential wall of said enlarged portion, a threaded alignment plug suspended in the interior of said enlarged portion, a movable clamping sleeve having an inner bore surface adapted to fit snugly over said bearing surface and also having a plurality of circumferentially spaced apart and longitudinally extending recesses along its inner bore surface, said sleeve being rotatable with respect to said body from a first to a second of two positions on said bearing surface, a stop abutment for each sleeve recess at the frontal face of said sleeve, respective ones of said sleeve and body recesses being in alignment for said first position, wherein sets of said aligned recesses provide transverse clearances for receiving and nesting threaded cutting chasers such that the cutting surfaces thereof confront said threaded plug and the frontal ends of said chasers rest on correlated stop abutments to prevent forward longitudinal motion of the nested chasers, whereby said chasers are initially aligned to be clamped to said die body, said aligned recesses being parted upon movement of said sleeve to the second of its positions, and cam means on said sleeve for operatively engaging said chasers upon sleeve movement from said first to second of its positions and causing said chasers during such movement to shift off said stop abutments and out of respective sleeve recesses and into positive threaded engagement with the confronting alignment plug, whereby said chasers are firmly clamped between said sleeve bore surface and said plug so that accurate alignment of the cutting threads of said chasers is effected.

6. Apparatus as defined in claim 5 wherein, said die body recesses have interior beds for firmly supporting the confronting portions of said chasers extending rearwardly from said alignment plug, said chasers being ultimately clamped between the inner bore surface of said sleeve and the confronting surfaces of said plug and recess beds.

7. Apparatus as defined in claim 6 wherein, said recess beds being dimensioned with respect to the longitudinal axis of said body to determine a desired cutting angle for said chasers.

References Cited in the file of this patent

UNITED STATES PATENTS

| | | |
|---|---|---|
| 758,840 | Keiper | May 3, 1904 |
| 1,581,023 | Saylor | Apr. 13, 1926 |
| 2,350,313 | Ingwer | May 30, 1944 |